United States Patent
Jang et al.

(10) Patent No.: US 10,345,850 B2
(45) Date of Patent: Jul. 9, 2019

(54) METHOD AND APPARATUS FOR ADAPTIVE DEVICE RE-CONFIGURATION

(71) Applicant: Samsung Electronics Co., Ltd., Gyeonggi-do (KR)

(72) Inventors: Kyoungdon Jang, Incheon (KR); Dohyoung Kim, Gyeonggi-do (KR); Joohwan Kim, Gyeonggi-do (KR); Hyunjin Park, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 567 days.

(21) Appl. No.: 14/819,701

(22) Filed: Aug. 6, 2015

(65) Prior Publication Data

US 2016/0050111 A1   Feb. 18, 2016

(30) Foreign Application Priority Data

Aug. 12, 2014 (KR) .................. 10-2014-0104678

(51) Int. Cl.
| | |
|---|---|
| *G06F 13/24* | (2006.01) |
| *G06F 1/08* | (2006.01) |
| *H04L 12/24* | (2006.01) |
| *H04L 7/00* | (2006.01) |
| *G06F 13/20* | (2006.01) |
| *H04L 12/26* | (2006.01) |

(52) U.S. Cl.
CPC .............. *G06F 1/08* (2013.01); *G06F 13/20* (2013.01); *G06F 13/24* (2013.01); *H04L 7/0008* (2013.01); *H04L 41/0816* (2013.01); *H04L 41/0896* (2013.01); *H04L 43/0888* (2013.01)

(58) Field of Classification Search
CPC ............................. H04L 67/10; H04W 84/12
USPC ......................................................... 710/316
See application file for complete search history.

(56) References Cited

U.S. PATENT DOCUMENTS

| | | | | |
|---|---|---|---|---|
| 6,615,286 B1 * | 9/2003 | Chobotaro | ............... | G06F 8/65 710/10 |
| 2005/0033876 A1 * | 2/2005 | Hanes | ................... | G06F 13/102 710/29 |
| 2008/0049630 A1 * | 2/2008 | Kozisek | .............. | H04L 41/0823 370/250 |
| 2009/0094401 A1 * | 4/2009 | Larson | .................... | H04L 45/00 710/316 |
| 2009/0327689 A1 * | 12/2009 | Lazar | .................. | G06F 9/44505 713/100 |
| 2012/0005580 A1 * | 1/2012 | Flemming | ............. | G06F 11/349 715/735 |
| 2012/0022713 A1 * | 1/2012 | Deaver, Sr. | ............ | G05B 17/02 700/298 |
| 2012/0102345 A1 | 4/2012 | Park et al. | | |
| 2012/0178465 A1 * | 7/2012 | Lin | ........................ | H04W 24/10 455/450 |

(Continued)

FOREIGN PATENT DOCUMENTS

KR    10-2012-0040819 A    4/2012

*Primary Examiner* — Titus Wong
(74) *Attorney, Agent, or Firm* — Cha—Reiter, LLC.

(57) ABSTRACT

An apparatus is provided comprising a memory and a processor configured to: execute a device driver for operating a device; detect a data throughput associated with the device driver; identify a configuration setting based on the data throughput; and re-configure the apparatus based on the configuration setting.

20 Claims, 13 Drawing Sheets

(56) References Cited

U.S. PATENT DOCUMENTS

| | | | |
|---|---|---|---|
| 2013/0268738 A1 | 10/2013 | Zhang | |
| 2013/0303181 A1* | 11/2013 | Rajurkar | H04W 72/0453 455/452.1 |
| 2014/0018033 A1* | 1/2014 | Luna | H04W 28/0215 455/405 |
| 2014/0195834 A1* | 7/2014 | Weinsberg | G06F 9/544 713/321 |

\* cited by examiner

FIG. 3

```
root@site:/ # cat /proc/net/dev
cat /proc/net/dev
Inter-|   Receive                                                |  Transmit
 face |bytes    packets errs drop fifo frame compressed multicast|bytes    packets errs drop fifo colls carrier compressed
rmnet3:      0        0    0    0    0     0          0        0     0         0    0    0    0     0       0          0
wlan0:     130        2    2    2    0     0          0        0     0         0    0    0    0     0       0          0
rmnet4:      0        0    0    0    0     0          0        0     0         0    0    0    0     0       0          0
  p2p:       0        0    0    0    0     0          0        0     0         0    0    0    0     0       0          0
  sit0:      0        0    0    0    0     0          0        0     0         0    0    0    0     0       0          0
rmnet0:      0        0    0    0    0     0          0        0     0         0    0    0    0     0       0          0
rmnet5:      0        0    0    0    0     0          0        0     0         0    0    0    0     0       0          0
   lo:       0        0    0    0    0     0          0        0     0         0    0    0    0     0       0          0
rmnet1:      0        0    0    0    0     0          0        0     0         0    0    0    0     0       0          0
rmnet6:      0        0    0    0    0     0          0        0     0         0    0    0    0     0       0          0
rmnet2:      0        0    0    0    0     0          0        0     0         0    0    0    0     0       0          0
ip6tnl0:     0        0    0    0    0     0          0        0     0         0    0    0    0     0       0          0
rmnet7:      0        0    0    0    0     0          0        0     0         0    0    0    0     0       0          0
```

METHOD AND APPARATUS FOR ADAPTIVE DEVICE RE-CONFIGURATION

CLAIM OF PRIORITY

This application claims priority from and the benefit under 35 U.S.C. § 119(a) of Korean Patent Application No. 10-2014-0104678, filed on Aug. 12, 2014, which is hereby incorporated by reference for all purposes as if fully set forth herein.

BACKGROUND

1. Field of the Disclosure

The present disclosure is directed to electronic devices, and more particularly to a method and apparatus for adaptive device re-configuration.

2. Description of the Prior Art

In the case of the operation that requires a high frequency of a bus and/or a processor (e.g., a CPU), the electronic device is to request and release the quality of service (QoS) separately in each driver, using the power management (PM) QoS controlled by a power driver.

However, in this method, the CPU/bus frequency should be configured separately according to the throughput requested by each driver. According to the method by which the CPU/bus frequency is configured separately, it is difficult to configure and correct the frequency, and it may bring about the problem of timing due to a difference in the implementation methods of the drivers.

SUMMARY

According to aspects of the disclosure, an apparatus is provided comprising a memory and at least one processor configured to: execute a device driver for operating a device; detect a data throughput associated with the device driver; identify a configuration setting based on the data throughput; and re-configure the apparatus based on the configuration setting.

According to aspects of the disclosure, a method is provided comprising: execute, by an electronic device, a device driver for operating a hardware component of the electronic device; detect a data throughput associated with the device driver; identify a configuration setting based on the data throughput; and re-configure the electronic device based on the configuration setting.

BRIEF DESCRIPTION OF THE DRAWINGS

The above features, and advantages of the present disclosure will be more apparent from the following detailed description in conjunction with the accompanying drawings, in which:

FIG. 3 illustrates an example of a "/proc/net/dev" file, according to aspects of the disclosure;

DETAILED DESCRIPTION

Figure 1:
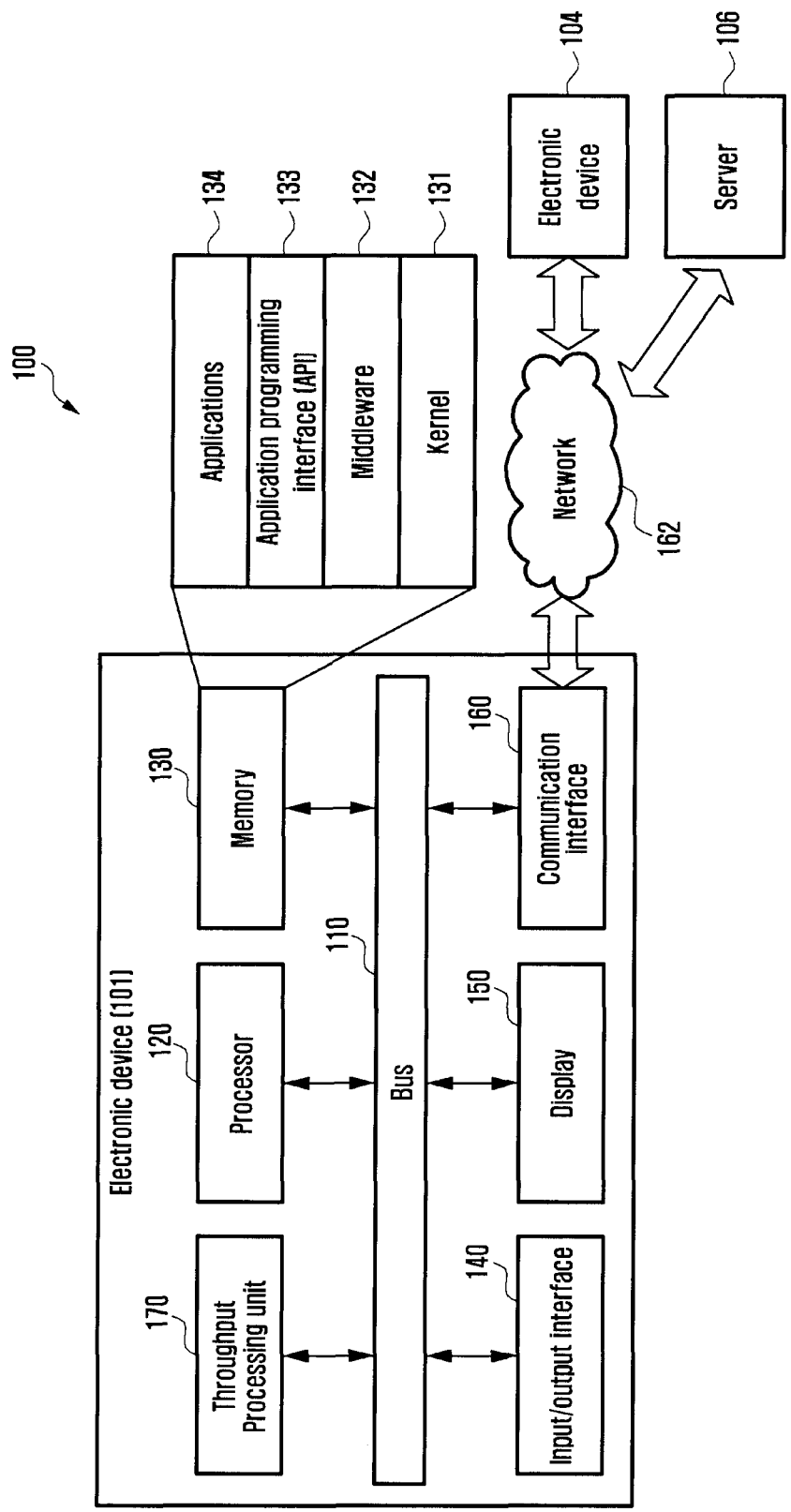
FIG. 1 is a diagram of an example of a network environment, according to aspects of the disclosure.

Hereinafter, the present disclosure will be described in detail with reference to the accompanying drawings. The present disclosure may have various modifications and embodiments and thus will be described in detail with reference to specific embodiments illustrated in the drawings. However, it should be understood that the present disclosure is not limited to the particular embodiments, but includes all modifications, equivalents, and/or alternatives within the spirit and scope of the present disclosure. In the description of the drawings, identical or similar reference numerals are used to designate identical or similar elements. The expressions such as "include" and "may include" which may be used in the present disclosure denote the presence of the disclosed functions, operations, and constituent elements and do not limit one or more additional functions, operations, and constituent elements. In the present disclosure, the terms such as "include" and/or "have" may be construed to denote a certain characteristic, number, step, operation, constituent element, component or a combination thereof, but may not be construed to exclude the existence of or a possibility of addition of one or more other characteristics, numbers, steps, operations, constituent elements, components or combinations thereof.

Furthermore, in the present disclosure, the expression "and/or" includes any and all combinations of the associated listed words. For example, the expression "A and/or B" may include A, may include B, or may include both A and B.

In the present disclosure, expressions including ordinal numbers, such as "first" and "second," etc., may modify various elements. However, such elements are not limited by the above expressions. For example, the above expressions do not limit the sequence and/or importance of the elements. The above expressions are used merely for the purpose to distinguish an element from the other elements. For example, a first user device and a second user device indicate different user devices although both of them are user devices. For example, a first element could be termed a second element, and similarly, a second element could be also termed a first element without departing from the scope of the present disclosure.

In the case where a component is referred to as being "connected" or "accessed" to another component, it should be understood that not only the component is directly connected or accessed to the other component, but also there may exist another component between them. Meanwhile, in the case where a component is referred to as being "directly connected" or "directly accessed" to another component, it should be understood that there is no component therebetween.

The terms used in the present disclosure are only used to describe specific various embodiments, and are not intended to limit the present disclosure. As used herein, the singular forms are intended to include the plural forms as well, unless the context clearly indicates otherwise. Singular forms are intended to include plural forms unless the context clearly indicates otherwise.

Unless defined differently, all terms used herein, which include technical terminologies or scientific terminologies, have the same meaning as a person skilled in the art to which the present disclosure belongs. Such terms as those defined in a generally used dictionary are to be interpreted to have the meanings equal to the contextual meanings in the relevant field of art, and are not to be interpreted to have ideal or excessively formal meanings unless clearly defined in the present disclosure.

An electronic device, according to various embodiments of the present disclosure, may adopt an image processing function by which color-difference data may be coded according to the pixel pattern when processing an image comprised of brightness data, the first color-difference data, and the second color-difference data. For example, an electronic device may be a smart phone, a tablet PC (Personal Computer), a mobile phone, a video phone, an e-book reader, a desktop PC, a laptop PC, a netbook computer, a PDA (Personal Digital Assistant), a PMP (Portable Multimedia Player), an MP3 player, a portable medical device, a digital camera, or a wearable device (e.g., an HMD (Head-Mounted Device) such as electronic glasses, electronic clothes, an electronic bracelet, an electronic necklace, an electronic appcessory, or a smart watch).

According to some embodiments, the electronic devices may be smart home appliances that have an image processing function for coding the image according to the pixel pattern. For example, an electronic device may be a TV, a DVD (Digital Video Disk) player, audio equipment, a refrigerator, an air conditioner, a vacuum cleaner, an oven, a microwave, a washing machine, an air cleaner, a set-top box, a TV box (e.g., Samsung HomeSync™, Apple TV™, Google TV™, etc.), a game console, an electronic dictionary, an electronic key, a camcorder, or an electronic picture frame.

According to some embodiments, an electronic device may be a medical device (e.g., MRA (Magnetic Resonance Angiography), MRI (Magnetic Resonance Imaging), CT (Computed Tomography), ultrasonography, etc.), a navigation device, a GPS (Global Positioning System) receiver, an EDR (Event Data Recorder), an FDR (Flight Data Recorder), a car infotainment device, electronic equipment for ship (e.g., a marine navigation system, a gyrocompass, etc.), avionics, security equipment, vehicle head units, industrial or home robots, automated teller machines in banks, or point of sales (POS) in stores.

According to some embodiments, an electronic device may be furniture or part of a building or construction having a communication function, an electronic board, an electronic signature receiving device, a projector, or various measuring instruments (e.g., a water meter, an electric meter, a gas meter, a wave meter, etc.). An electronic device disclosed herein may be one of the above-mentioned devices or any combination thereof. Also, an electronic device according to various embodiments of the present disclosure may be a flexible device. Also, an electronic device according to various embodiments of the present disclosure is not limited to the above-described devices.

Hereinafter, an electronic device according to various embodiments of the present disclosure will be described with reference to the accompanying drawings. The term "user" used in various embodiments may refer to a person who uses an electronic device or a device (for example, an artificial intelligence electronic device) that uses an electronic device.

FIG. 1 is a diagram of an example of a network environment 100, according to aspects of the disclosure. Referring to FIG. 1, the electronic device 101 may include, but not limited to, a bus 110, a processor 120, a memory 130, an input/output interface 140, a display 150, a communication interface 160, and an application control module 170.

The bus may include a bus 110 (MIF) for connecting a processor 120 with other devices (e.g., a memory 130, an input/output interface 140, a display 150, a communication interface 160, or the like), and a bus (INT) for the internal operation of the processor 120. The bus 110 may be a circuit used to connect the elements mentioned above, and transfers communication data (e.g., a control message) between the elements.

The processor 120 may include any suitable type of processing circuitry. For example, the processor may include any combination of: one or more general-purpose processors (e.g., ARM-based processors, multi-core processors, etc.), a Field-Programmable Gate Array (FPGA), an Application-Specific Integrated Circuit (ASIC), a Digital Signal Processor (DSP), a Programmable Logic Device (PLD), etc. In operation, the processor 120 may receive commands from the other elements (e.g., the memory 130, the input/output interface 140, the display 150, the communication interface 160, or the throughput processing module 170, etc.) through the bus 110, interpret the received commands, and perform arithmetic or data processing operations in response.

The memory 130 may include any suitable type of volatile and non-volatile memory, such as Random-Access Memory (RAM), a Solid-State Drive (SSD), a network-accessible storage device (NAS), a cloud storage, a Read-Only Memory (ROM), a flash memory, etc. The memory 130 may store therein commands or data received from or created at the processor 120 or other elements (e.g., the input/output interface 140, the display 150, the communication interface 160, or the throughput processing module 170, etc.). The memory 130 may include programming modules such as a kernel 131, a middleware 132, an application programming interface (API) 133, and an application 134. Each of the programming modules may be composed of software, firmware, hardware, and any combination thereof.

The kernel 131 may control or manage system resources (e.g., the bus 110, the processor 120, or the memory 130, etc.) used for performing operations or functions of the other programming modules, e.g., the middleware 132, the API 133, or the application 134. Additionally, the kernel 131 may offer an interface that allows the middleware 132, the API 133 or the application 134 to access, control or manage individual elements of the electronic device 101.

The middleware 132 may perform intermediation by which the API 133 or the application 134 communicates with the kernel 131 to transmit or receive data. Additionally, in connection with task requests received from the applications 134, the middleware 132 may perform a control (e.g., scheduling or load balancing) for the task request by using technique such as assigning the priority for using a system resource of the electronic device 101 (e.g., the bus 110, the processor 120, or the memory 130, etc.) to at least one of the applications 134.

The API 133 which is an interface for allowing the application 134 to control a function provided by the kernel 131 or the middleware 132 may include, for example, at least one interface or function (e.g., a command) for a file control, a window control, an image processing, a text control, and the like.

According to embodiments, the application 134 may include an SMS/MMS application, an email application, a calendar application, an alarm application, a health care application (e.g., an application for measuring quantity of motion or blood sugar), an environment information application (e.g., an application for offering information about atmospheric pressure, humidity, or temperature, etc.), and the like. Additionally or alternatively, the application 134 may be an application associated with an exchange of information between the electronic device 101 and any external electronic device (e.g., an external electronic device 104). This type application may include a notification relay application for delivering specific information to an external electronic device, or a device management application for managing an external electronic device.

For example, the notification relay application may include a function to deliver notification information created at any other application of the electronic device 101 (e.g., the SMS/MMS application, the email application, the health care application, or the environment information application, etc.) to an external electronic device (e.g., the electronic device 104). Additionally or alternatively, the notification relay application may receive notification information from an external electronic device (e.g., the electronic device 104) and offer it to a user. The device management application may manage (e.g., install, remove or update) a certain function (a turn-on/turn-off of an external electronic device (or some components thereof), or an adjustment of brightness (or resolution) of a display) of any external electronic device (e.g., the electronic device 104) communicating with the electronic device 101, a certain application operating at such an external electronic device, or a certain service (e.g., a call service or a message service) offered by such an external electronic device.

According to embodiments, the application 134 may include a specific application specified depending on attributes (e.g., a type) of an external electronic device (e.g., the electronic device 104). For example, in case an external electronic device is an MP3 player, the application 134 may include a specific application associated with a play of music. Similarly, in case an external electronic device is a portable medical device, the application 134 may include a specific application associated with a health care. In an embodiment, the application 134 may include at least one of an application assigned to the electronic device 101 or an application received from an external electronic device (e.g., the server 106 or the electronic device 104).

The input/output interface 140 may deliver commands or data, entered by a user through an input/output unit (e.g., a sensor, a keyboard, or a touch screen), to the processor 120, the memory 130, the communication interface 160, or the application control module 170 via the bus 110. For example, the input/output interface 140 may offer data about a user's touch, entered through the touch screen, to the processor 120. Also, through the input/output unit (e.g., a speaker or a display), the input/output interface 140 may output commands or data, received from the processor 120, the memory 130, the communication interface 160, or the application control module 170 via the bus 110. For example, the input/output interface 140 may output voice data, processed through the processor 120, to a user through the speaker.

The display 150 may display thereon various kinds of information (e.g., multimedia data, text data, etc.) to a user.

The communication interface 160 may perform a communication between the electronic device 101 and any external electronic device (e.g., the electronic device 104 of the server 106). For example, the communication interface 160 may communicate with any external device by being connected with a network 162 through a wired or wireless communication. A wireless communication may include, but not limited to, at least one of WiFi (Wireless Fidelity), BT (Bluetooth), NFC (Near Field Communication), GPS (Global Positioning System), or a cellular communication (e.g., LTE, LTE-A, CDMA, WCDMA, UMTS, WiBro, or GSM, etc.). A wired communication may include, but not limited to, at least one of USB (Universal Serial Bus), HDMI (High Definition Multimedia Interface), RS-232 (Recommended Standard 232), or POTS (Plain Old Telephone Service).

According to an embodiment, the network 162 may be a communication network, which may include at least one of a computer network, the Internet, an internet of things, or a telephone network. According to an embodiment, a protocol (e.g., transport layer protocol, data link layer protocol, or physical layer protocol) for a communication between the electronic device 101 and any external device may be supported by at least one of the application 134, the API 133, the middleware 132, the kernel 131, or the communication interface 160. The throughput processing module 170 may be configured as a program in the processor 120. The throughput processing module 170 may input the size of the received data and the size of the transmitted data (e.g., the received packet data/the transmitted packet data of the driver) of the updated devices at a specific time interval to thereby calculate the current throughput (the size/time of data). In addition, the throughput processing module 170 may analyze the calculated throughput to determine a setup value of a corresponding driver, and may perform functions of an execution module using the determined setup value. For example, the throughput processing module 170 may include a data memory that is provided to correspond to each driver, and stores clock setup values corresponding to the throughput. In addition, the throughput processing module 170 may access the setup value corresponding to the throughput in the data memory of the corresponding driver to control the function of the execution module. In addition, the execution module may include a clock driving unit or a hardware operation controller. In this case, a setup value of the clock driving unit may be a clock value, and a setup value of the hardware operation controller may be an operation setup value of the hardware. In addition, the execution module may be an operation controller of an operating system, and the operating system controller may be a scheduler, or an interruption processing module. Furthermore, a setup value of the scheduler may be an affinity value or the priority of a task to be managed by the operating system, and a setup value of the interruption processing module may be an affinity value for the interruption process, or a priority setup value for the interruption process. Therefore, the throughput processing module 170 may determine the setup value corresponding to the throughput, and may control the operation of the hardware according to the setup value. For example, the throughput processing module 170 may provide a clock frequency (e.g., the CPU/MIF/INT frequency) corresponding to the clock driving unit, and configures affinity information to configure processor cores, and information to control the interruption operation. Therefore, the electronic device may configure the clock frequency of the processor 120 or the bus 110 (which may include the internal bus of the processor 120) using the clock frequency determined by the throughput processing module 170, and may allocate the resources of the processor 120 according to the throughput of the driver.

In some implementations, the processor 120 may include a heterogeneous multi-processor (HMP). The HMP may be comprised of one or more of the first processors (big core processors), which is a-high-performance processor capable of processing data at a high speed, and one or more of the second processors (little core processors), of which the performance is relatively lower than that of the first processor. For example, an octa-core HMP may include four big core processors and four little core processors. Therefore, in the case where the processor 120 is the HMP, the throughput processing module 170 may make a control to select the big core processor or the little core processor according to the size of data processed in the driver. In addition, the processor 120 may be a symmetric multi-processor (SMP). In the SMP, the throughput processing module 170 may allocate the data processing to a plurality of core processors according to the size of data processed in the driver.

In addition, the throughput controlled by the throughput processing module 170 may be the amount of data that can be processed by the driver within a predetermined time in the electronic device. The amount of data may include one or more of the amount of data input into the driver and the amount of data transmitted from the driver. The throughput may be the size of data that is processed in the driver within a predetermined time.

Figure 2:
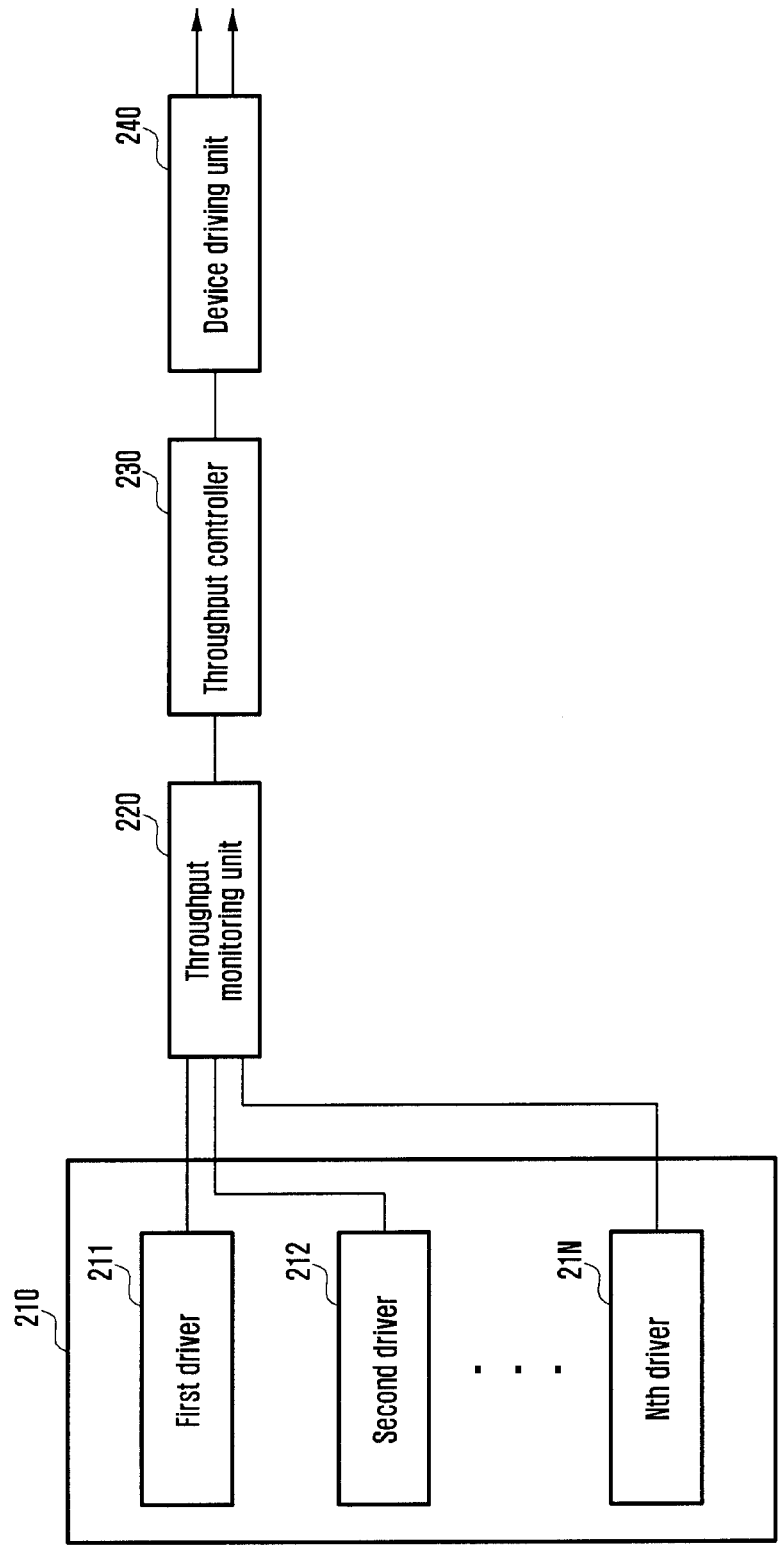
FIG. 2 is a diagram of an example of a throughput processing module, according to aspects of the disclosure.

FIG. 2 is a diagram of an example of a throughput processing module, according to aspects of the disclosure.

Referring to FIG. 2, the throughput processing module may include drivers 210, a throughput monitoring unit 220, a throughput controller 230, and a device driving unit 240.

The drivers 210 may include one or more drives 211 to 21N. For example, the drivers 210 may include a driver of the communication interface 160, a driver of a file system processed in the processor 120, or all of the drivers that can process the data, and can measure the processed data. For example, the drivers 210 may be a WIFI driver, a modulation and demodulation (MODEM) driver, or an inter-processor communication (IPC) driver. The drivers 210 may transmit and receive data in a corresponding driver environment, and may update the size of data to be processed in a corresponding file node position in order to allow the throughput monitoring unit 220 to read the size of the transmitted/ received data. In implementations in which Linux is used, a network device may be basically provided in the Linux kernel, and the electronic device may record the network throughput in the "/proc/net/dev" file of the Linux kernel. FIG. 3 illustrates the "/proc/net/dev" file of the Linux kernel.

The throughput monitoring unit 220 may monitor the drivers 210 to calculate the amount of data output from the driver into the throughput. That is, the throughput monitoring unit 220 may read the amount of the data renewed in each driver from the positions of changed values stored in the file node or the memory at a predetermined time interval. For example, the amount of data may refer to the amount of the data transmitted and received in the drivers 210. Afterwards, the throughput monitoring unit 220 may calculate the data throughput for a predetermined time period, and may create a throughput message using the calculated throughput to thereby transmit the same to the throughput controller 230. Additionally or alternative, the throughput message may include a driver identifier and an indication of the driver's throughput. Accordingly, in some implementations, the throughput monitoring unit 220 may calculate the throughput for the drivers 211 to 21N, and may create the messages including identifiers of the corresponding drivers and throughput information thereof to thereby output the same to the throughput controller 230.

The throughput controller 230 may analyze the calculated throughput output from the throughput monitoring unit 220 to determine the clock frequency of a corresponding driver device or change the operation setup values of the hardware. The throughput controller 230 may include tables that store the clock frequencies or the hardware operation setup values according to the throughput. In some implementations, a table for storing different setup values (e.g. configuration settings) may be provided for each of the drivers 211 to 21N. The throughput controller 230 may recognize the driver by parsing the throughput message, and may access the setup value of the device corresponding to the throughput in the reference data table corresponding to the driver to thereby output the setup value of the corresponding device. For example, the setup values of the device may include a clock frequency, associated priority, and/or associated bus bandwidth. Therefore, the device driving unit 240 may be a clock driving unit, a priority driving unit, and/or a bus band driving unit.

If the device driving unit 240 is the clock driving unit, the device driving unit 240 may drive the clock output from the throughput controller 230 as the clock of the corresponding device. Here, the clock may be the clock of the processor 120, and the bus clock. In addition, the bus clock may be the MIF, which is a clock of the bus connecting the CPU with the external devices (e.g., a memory), and the INT clock, which is a clock of the BUS for the internal operation of the processor 120.

As described above, the electronic device may configure the file nodes or the memories for measuring the setup values according to a plurality of throughput values. Additionally or alternatively, the electronic device may configure the CPU/bus clock frequency using the setup value, or may change the setup value of the HW device. In instances in which a multi-core processor is used, the electronic device may change the setup values of the operating system by, for example, configuring the enablement/disablement of the affinity (e.g., task/IRQ affinity). For example, the setup values according to the throughput may be configured as a table, and the setup values of the table may be obtained through experimental measurement in advance.

Figure 4:
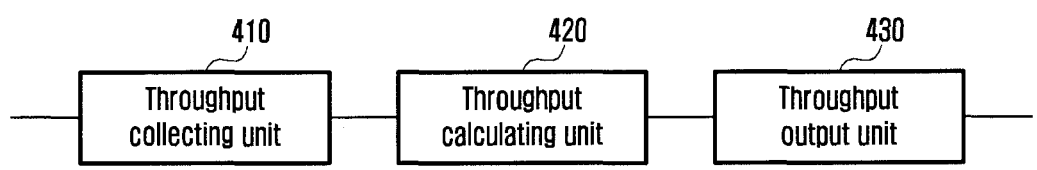
FIG. 4 is a diagram of an example of a throughput monitoring unit, according to aspects of the disclosure.

FIG. 4 is a diagram of an example of a throughput monitoring unit, according to aspects of the disclosure.

Referring to FIG. 4, the throughput monitoring unit may include a throughput collecting unit 410, a throughput calculating unit 420, and a throughput output unit 430.

The throughput collecting unit 410 may monitor the drivers 211 to 21N, and may detect the amount of data processed in the drivers 211 to 21N at a predetermined time interval. In some implementations, time interval may be equal or (otherwise based on) the frequency at which the drivers update the information about the amounts of data they transmit and/or receive. In addition, the throughput collecting unit 410 may collect the amounts of data input or output from the drivers (and the time) of the data renewed in the drivers at a predetermined time interval. For any given driver, the collected data may include the amount(s) of transmitted/received data by the driver, and identification information on the driver. For example, a driver tree (or a device tree), which is collected by the throughput collecting unit 410, may be the same as Table 1 below, and in this case, the size of the processed data (accumulated values of RX/TX data) may be shown in Table 2 below.

TABLE 1

```
boot_device@1 {
net_boost,label="WIFI";
net_boost,node="wlan0,p2p0";
...}
boot_device@2 {
net_boost,label="IPC";
net_boost,node="rmnet0,rmnet1,rmnet2,rmnet3
```

TABLE 2

| | proc/net/dev | |
|---|---|---|
| Inter-face | RX bytes | TX bytes |
| wlan0 | 35000 | 2000 |
| p2p0 | 4000 | 0 |
| rmnet0 | 0 | 0 |
| rmnet1 | 20000 | 1000 |
| rmnet2 | 0 | 0 |
| rmnet3 | 0 | 0 |

Then, the throughput calculating unit 420 may add the size of the collected input data and the size of the collected output data in the manner of Table 3 below to calculate the throughput for the size of the data to be processed per hour.

TABLE 3

```
sum = tx + rx
delta = sum − prev
Mbps = (delta * 8) / 1000000 / sec
prev = sum
```

For example, the throughput calculating unit 420, as shown in Table 3, may include an adder (sum) that adds the size of input data and the size of output data, a differential value calculator (delta) that subtracts the previous sum value from the output of the adder, a throughput creator (Mbps) that convert the differential value into a transmission rate of the data per hour to thereby create the throughput, and a buffer (prev, here the buffer may store the previous sum value) that stores the output of the differential value calculator as the previous sum value. In some implementations, the throughput calculating unit 420 may measure the throughput of each driver in the manner above.

After calculating the throughput for a given driver, the throughput output unit 430 may create a throughput message including the throughput calculated by the throughput calculating unit 420 and the driver identifier to thereby write the same in the file node. Alternatively, the throughput output unit 430 may store the throughput message in the memory. At this time, in the case of the driver as Table 1 and Table 2, the output throughput message may have the structure as shown in Table 4 below, which includes the driver identifier and the throughput {register id(dev)/network throughput}.

TABLE 4

| T-put(WIFI) | NUM(1) |
|---|---|
| T-put(IPC) | NUM(2) |

In addition, as shown in FIG. 2, the drivers 210 may include at least two drivers. Then, the throughput collecting unit 410 of the throughput monitoring unit 220 may collect the size of the data processed in the drivers 211 to 21N at a predetermined time interval, and the throughput calculating unit 420 may add the amount of the input data and the amount of the output data among the data collected in the drivers to calculate the size of data to be processed per hour as the throughput of each driver. The throughput output unit 430 may create the throughput message including the calculated throughput and the driver identifier for the drivers 211 to 21N, and may provide the same to the throughput controller 230.

Figure 5A:
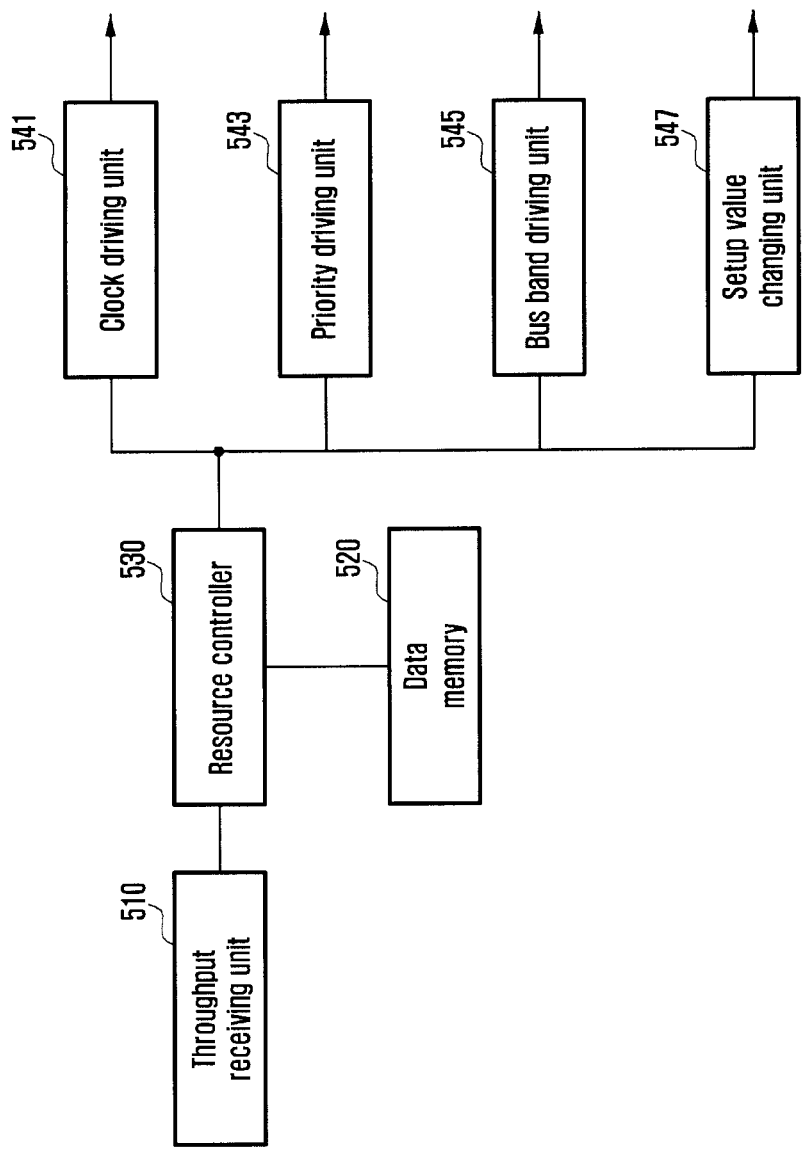
FIG. 5A is a diagram of an example of a throughput controller, according to aspects of the disclosure.
Figure 5B:
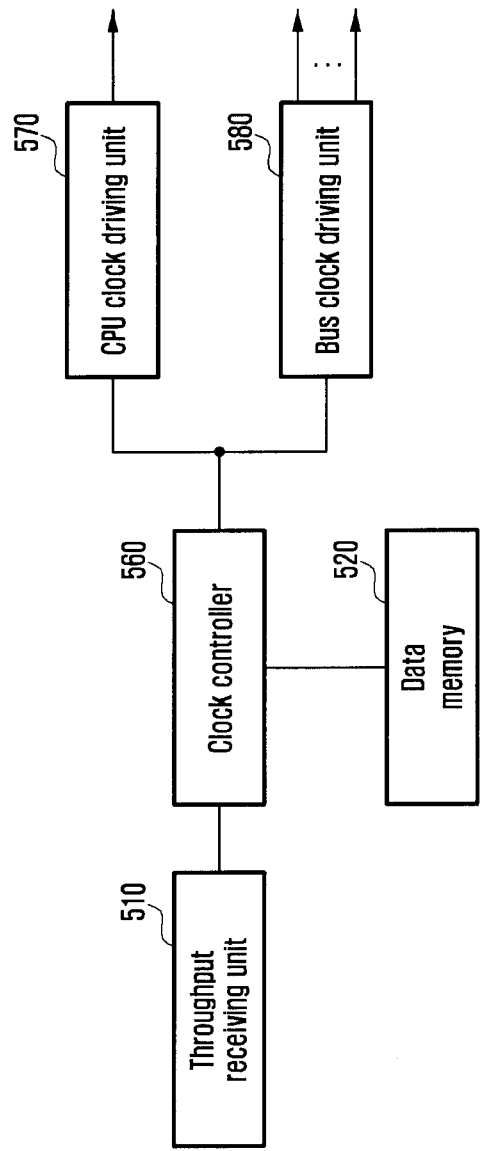
FIG. 5B is a diagram of another example of a throughput controller, according to aspects of the disclosure.

FIGS. 5A and 5B illustrate examples of a throughput controller, according to aspects of the disclosure. Referring to FIG. 5A, the throughput controller 230 may include a throughput receiving unit 510, a data memory 520, and a resource controller 530. In addition, the device driving unit 240 may include a clock driving unit 541, a priority driving unit 543, a bus band driving unit 545 for changing the bandwidth setup value of the bus, and a setup value changing unit 547.

The data memory 520 may include tables that correspond to the drivers one by one. In addition, the data tables may map the throughput of the corresponding drivers to different resource setup values (e.g., configuration settings). For example, the data table corresponding to the WIFI driver may map various clock frequencies to corresponding throughput values. In some implementations, the data table may map a plurality of setup values to respective throughput values that are calculated by the throughput monitoring unit 220.

The throughput receiving unit 510 may access the throughput message output from the throughput monitoring unit 220, and may parse the accessed throughput message to extract driver identification information and throughput information therefrom. The resource controller 530 may analyze the driver identification information in the parsed throughput message to determine the driver device, and may access the data table stored in the memory 520 to retrieve the setup value corresponding to the throughput information in the message.

As noted above, in some implementations, the data memory 520 may store a plurality of setup values corresponding to the throughput. For example, the setup values stored in the data memory 520 may be configured independently according to each device, and the setup values may be associated with respective throughput values. More particularly, in some implementations, the data memory 520 may store tables corresponding to different devices, such that the respective table of each device maps different setup values for reconfiguring that device (and/or other devices, such as a bus controller or CPU) to corresponding throughput values. The setup values of the data table may be configured to be mapped with the throughput.

The device driving unit 240 may include a clock driving unit 541 that changes the clock frequency of the device, a priority driving unit 543 that changes the priority for the HW device process, a bus band driving unit 545 that changes the bandwidth setup value of the bus, and a setup value changing unit 547 that changes the setup value of the subordinate device connected with the device.

FIG. 5B shows the case where the device driving unit 240 is the clock driving unit 541.

Referring to FIG. 5B, the throughput controller 230 may include a throughput receiving unit 510, a data memory 520, and a clock controller 560. In addition, the clock driving unit 541 may include a CPU clock driving unit 570, and a bus clock driving unit 580.

The data memory 520 may store tables corresponding to different respective drivers. In addition, the reference data table may store clock data that is mapped with the throughput of the corresponding driver to configure the clock. For example, the reference data table corresponding to the WIFI driver may store clock data that can be used change the clock frequency of the WiFi adapter (or a bus connecting the WiFi adapter to the processor) according to the throughput of data transmitted/received through WIFI communication. At this time, the reference data table may have the clock data that is mapped with the throughput value calculated in the throughput monitoring unit 220.

The throughput receiving unit 510 may access the throughput message output from the throughput monitoring unit 220, and may parse the accessed throughput message to thereby extract the driver identification information and the throughput information. The clock controller 560 may analyze the driver identification information in the parsed throughput message to thereby determine the driver device, and may access the clock data corresponding to the throughput information in the setup value table of the determined driver device. Afterwards, the clock controller may use the clock data to change the frequency of a clock associated with the driver.

For example, the data memory 520 may store setup values of a plurality of clocks corresponding to the throughput. In some implementations, the clock setup value stored in the data memory 520 may include the process (or the CPU) clock data and the bus clock data. In addition, the bus clock may include the bus clock MIF between the processor and the external devices, and the bus clock INT between the elements in the processor. The clock controller may determine a new CPU clock frequency (the processor clock) and a new bus clock frequenc(ies) (e.g., the MIF and the INT), which are mapped to the throughput measured in the data memory, and may transfer the same to the clock driving unit. Then, the CPU clock driving unit 570 may cause the CPU clock to operate at the new frequency, and the bus clock driving unit 580 may cause the MIF clock and the INT clock to operate at the new bus frequenc(ies).

The processor 120 of the electronic device may include a multi-core processor (a dual-core processor, a quad-core processor, a hexa-core processor, an octa-core processor, a magni-core processor, or the like). The multi-core processor may include a processor that is integrated as a single package with two or more independent cores, which is referred to as a chip level multi-processor (CMP) as well. Since the multi-core processor has a plurality of cores mounted thereon, it is able to operate at a low frequency compared to the single-core processors. In addition, the program supporting the multi-core processor with two or more cores may shorten the working time, compared with the single-core processor.

Figure 6:
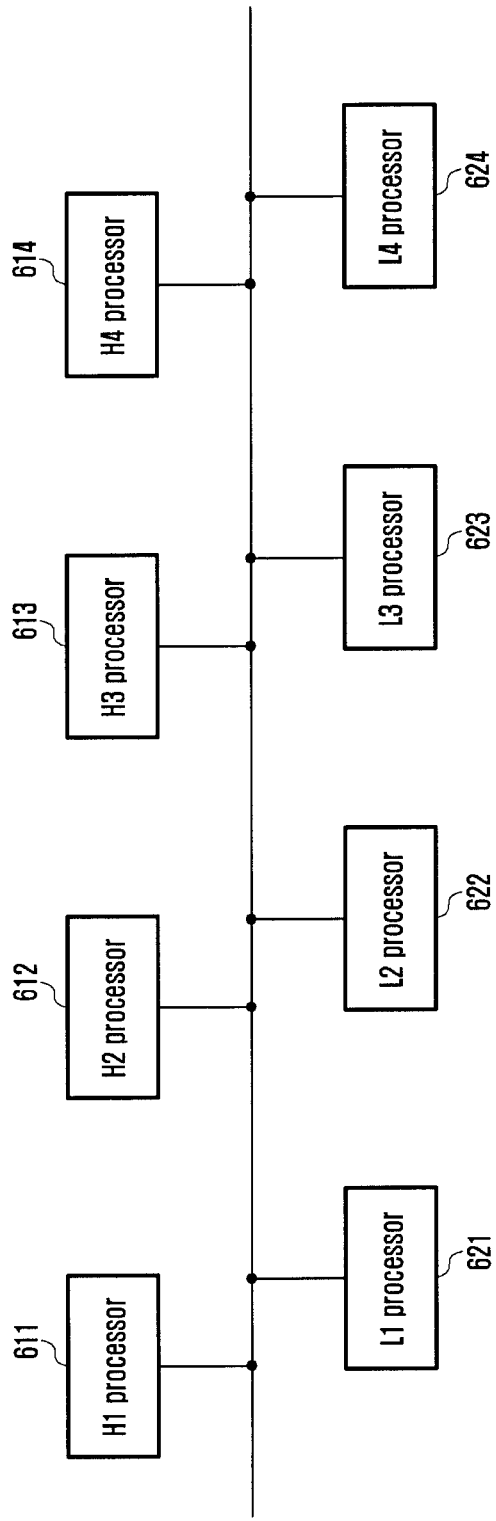
FIG. 6 is a diagram of an example of a heterogeneous multi-core processor, according to aspects of the disclosure.

In addition, the multi-core processor may include a plurality of processors that have different features (e.g., low power, or high-performance) from each other. FIG. 6 illustrates a configuration of a heterogeneous multi-core processor. The heterogeneous multi-core processor (hereinafter, referred to as an "HMP") may include a multi-core processor comprised of cores that are specialized on different purposes rather than the identical and general processor cores. For example, when the electronic device is transmitting/receiving data, if the throughput is low, a low speed and a low performance processor (e.g., a little core processor) may be desirable, whereas if the throughput is high, a high speed and a high-performance processor (e.g., a big core processor) may be desirable. Accordingly, it may be preferable to allocate the cores of the processor promptly for the use, according to the throughput, when using the multi-core processor. FIG. 6 shows an example of an octa-core processor adopting four big core processors 611 to 614, and four little core processors 621 to 624.

Figure 7:
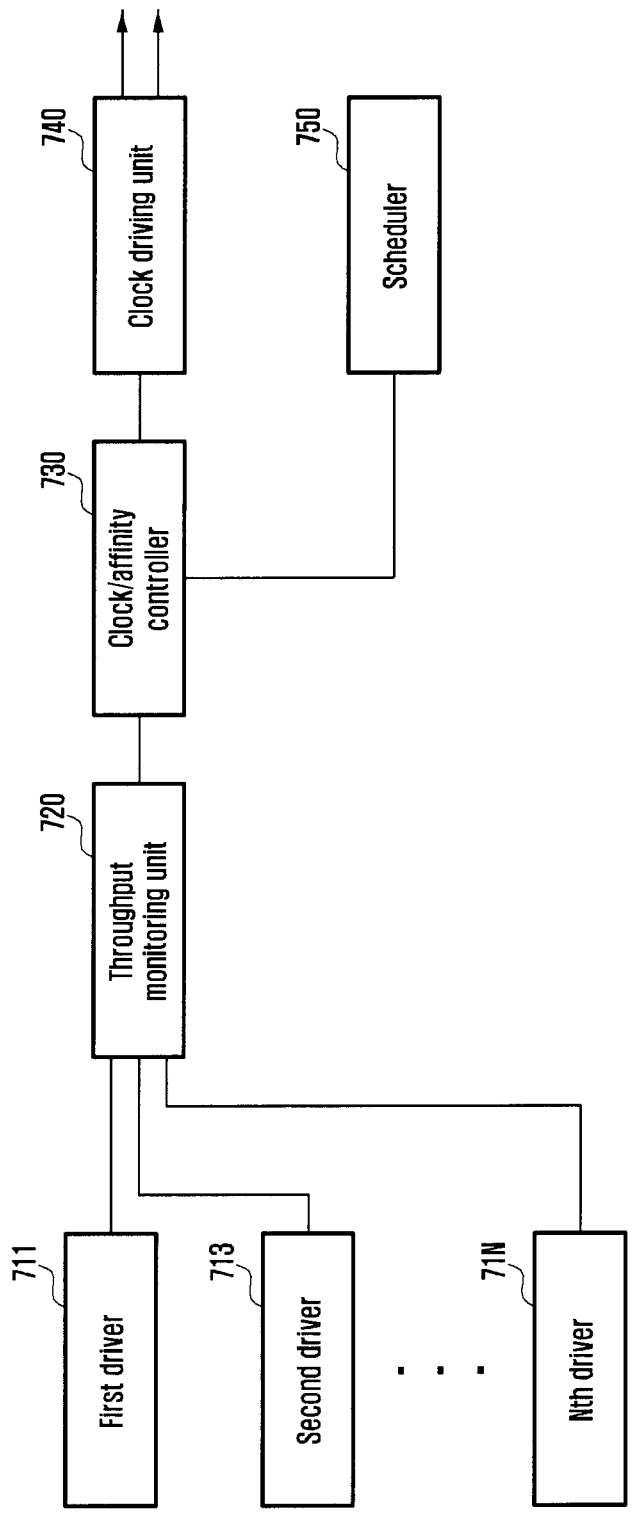
FIG. 7 is a diagram of an example of an electronic device configuration, according to aspects of the disclosure.

FIG. 7 is a diagram of an example of an electronic device configuration, according to aspects of the disclosure.

Referring to FIG. 7, the electronic device may include a driver 711 to 71N, a throughput monitoring unit 720, a throughput controller 730, a clock driving unit 740, and a scheduler 750.

The drivers 711 to 71N may configure an affinity processor core of a corresponding driver, and may renew the data processed in the corresponding driver. In addition, the throughput monitoring unit 720 may collect the processed data by monitoring the driver, and may calculate the size of the collected data to thereby calculate the throughput. The throughput controller 730 may adopt a data memory for storing the setup values, and may access the setup values corresponding to the throughput in the data memory. For example, the setup values may be enablement/disablement values of the clocks and the affinity. The throughput controller 720 may determine the clocks (the CPU, the bus, or the like) corresponding to the throughput, and enablement/disablement information on the affinity processor configured in the corresponding driver. The clock driving unit 740 may provide the clocks determined in the throughput controller 730. The scheduler 750 may schedule threads related to the drivers according to the affinity enablement/disablement determined in the throughput controller 730 in scheduling.

The electronic device may extract the setup values according to the throughput in consideration of various environments used in the drivers 711 to 71N. In addition, the electronic device may consider various factors when extracting values conforming to the features of the drivers 711 to 71N. For example, the driver, which processes the data, such as the WIFI/IPC, may divide the thread to be processed according to the processed section of the data. For instance, the corresponding threads may be operated in the same core to thereby prevent the response delay of a specific core due to the power control (sleep/hotplug-out) in the data streaming process.

Therefore, in order to process the data in the same core, it is preferable to set the task affinity and the IRQ affinity of all threads associated with the driver to the same core. In addition, the CPU/bus frequency may be configured such that the additional offset (the extra for performing another task/IRQ) may be added to the result of measuring the amount of data (100 Mbps, or 300 Mbps in the case of the network) corresponding to the throughput processed in the drivers 711 to 71N, and the clock of the CPU or the bus requested in the corresponding throughput using the amount of the data processed for "irq count*1 irq." For example, the setup values may be extracted by collecting the throughput values of the drivers, and parameters, such as the frequency of the CPU (the little core/the big core), the frequency of the bus (MIF/INT), the task affinity, or the IRQ affinity, corresponding thereto.

According to the throughput processed in the above-mentioned method, the tables for storing the clock data and the affinity enablement/disablement information may be created. In some implementations, a different table may be created for each device (e.g., WIFI, MODEM, IPC, or the like). In addition, a plurality of tables created as described above may be stored in the data memory. At this time, the information constituting the table may include the throughput values to be triggered, and the CPU frequency/bus frequency/IRQ affinity setup value/task affinity setup value. For example, each table may be arranged as shown in Table 5 below.

TABLE 5

| Throughput value | CPU freq. | BUS freq | BUS freq | IRQ affinity | TASK affinity |
|---|---|---|---|---|---|
| — | — | — | — | — | — |
| — | — | — | — | — | — |
| 100 Mbps | 1.9 GHz | 533 Mhz | 333 Mhz | ON | OFF |
| — | — | — | — | — | — |
| — | — | — | — | — | — |
| — | — | — | — | — | — |

The drivers 711 to 71N may make the file nodes in order for the throughput monitoring unit 720 to read the throughput. The network device may basically provide the size of the data based on which the throughput may be calculated in the Linux kernel (e.g., in the /proc/net/dev file) as shown in FIG. 3. In addition, the drivers 711 to 71N may configure the affinity CPU and the default CPU when creating the task. The affinity CPU may be allocated when the affinity information is enabled, and the default CPU may be allocated when the affinity information is disabled.

The throughput monitoring unit 720 may read the size of the data processed in the drivers 711 to 71N at a predetermined time interval, and may calculate the throughput using the same to thereby transfer the throughput to the throughput controller 730. The throughput monitoring unit 720, which is triggered when booting the device, may read the throughput value at a constant time interval to thereby transfer the read throughput value to the throughput controller 730. For example, the values may be recorded in "/dev/network_throughput" in the Linux kernel, and if the registration is made in the corresponding node, whenever the value is recorded, the throughput controller 730 may be notified of the same.

Then, the throughput controller 730 may change the CPU/bus clock frequency, or the task/IRQ affinity of one or more processes (or threads) associated with the driver(s) according to the throughput value calculated in the throughput monitoring unit 720, with reference to the data memory of the corresponding driver. The change in the CPU clock or the bus (MIF, INT) clock may be transferred through the PM QoS API, and the throughput controller 730 may compare the throughput value with the setup value of the data memory to thereby determine the minimum value or the maximum value.

In addition, the task/IRQ affinity may be registered at the creation point through the API that is newly provided in the drivers 711 to 71N, and the throughput controller 730 may dynamically configure the affinity through a method for changing the scheduler configuration. The scheduler 750 may make a scheduling of the task/IRQ execution, and may schedule the corresponding processor according to the enablement/disablement information on the affinity processor core configured in the throughput controller 730 at the time of scheduling. When the affinity is enabled, the scheduling for activating the allocated affinity processor may be performed, and when the affinity is disabled, the scheduling for activating the allocated default processor may be performed.

Figure 8:
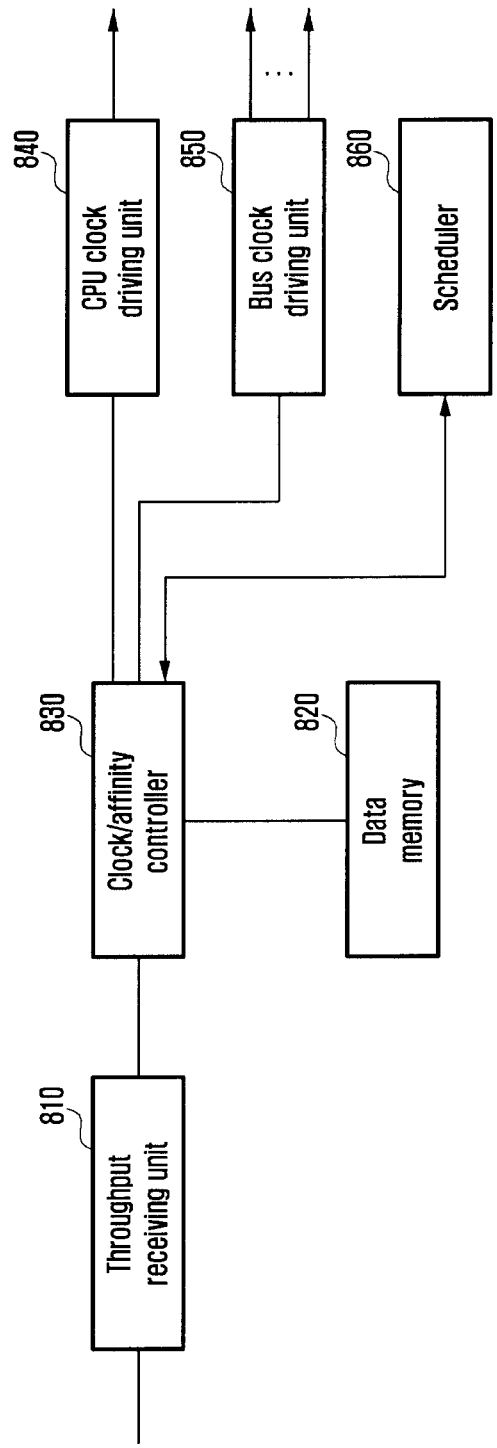
FIG. 8 is a diagram of an example of a throughput controller, according to aspects of the disclosure.

FIG. 8 illustrates a configuration of the throughput controller that determines and processes the setup values of hardware and/or software according to the throughput in the electronic device adopting a heterogeneous multi-processor.

The embodiment of changing the setup values of the hardware device may include functions of changing the CPU/bus frequency, changing the setup value of the bandwidth of the bus, changing the priority for the HW device process, or changing the setup value of the subordinate device connected with the electronic device. In this case, the device driving unit may include at least one of the clock driving unit 541, the priority driving unit 543, the bus band driving unit 545 for changing the bandwidth setup value of the bus, and a setup value changing unit 547, as shown in FIG. 5A. The method for changing the setup values in terms of SW may provide a common framework to configure the affinity (IRQ/task affinity) or to change the priority of the corresponding task, according to the throughput of the driver, in the electronic device.

Hereinafter, the description will be made of the case in which the device driving unit is a clock driving unit, and the software driving unit is a scheduler. In this example, the resource controller of FIG. 5A may be a clock/affinity controller. Referring to FIG. 8, the throughput controller 730 may include a throughput receiving unit 810, a data memory 820, and a clock/affinity controller 830. There may be as many data memories 820 as the number of drivers (or data types), and the data memory 820 may store the clock and the affinity enablement/disablement information corresponding to each throughput. In addition, the throughput receiving unit 819 may parse the received throughput message into the driver identification information and the throughput value. In addition, the clock/affinity controller 830 may analyze the parsed throughput message to determine the driver device, and may determine the clock frequency values corresponding to the throughput in the setup value table of the determined driver device. In addition, the clock/affinity controller 830 may analyze the throughput to thereby determine the affinity processor enablement/disablement in the corresponding driver.

As described above, the data memory 820 may include an area for storing process/bus clock data, and an area for storing affinity enablement/disablement information determined by the clock/affinity controller 830. In addition, the clock/affinity controller 830, according to the throughput value of the throughput receiving unit 810, may access the process clock and the bus clock, which correspond to the throughput value of the data memory 820 to thereby output the value to the clock driving unit 740. In addition, the clock/affinity controller 830 may analyze the throughput value to thereby configure the affinity information to be enabled or disabled, which activates or deactivates the affinity processor. In some implementations, enabling the affinity for a given driver may include changing an affinity configuration setting in order to assign one or more processes (or threads) associated with the given driver to the affinity processor (e.g., a big core).

Then, the CPU clock driving unit 840 of the clock driving unit 740 may drive the CPU clock configured in the clock/affinity controller 830 as the processor clock, and the bus clock driving unit 850 may drive the bus clock configured in the clock/affinity controller 830 as the corresponding bus clock. For example, the bus clock may include the bus clock MIF between the processor and the external devices, and the bus clock INT between the internal elements of the processor. In addition, the scheduler 860 may perform the scheduling of the affinity processor core when the affinity information configured in the clock/affinity controller 830 is enabled, and may perform the scheduling of the default processor core when the affinity information is disabled. In some implementations, the affinity processor may process data at a high speed compared to the default processor.

Figure 12:
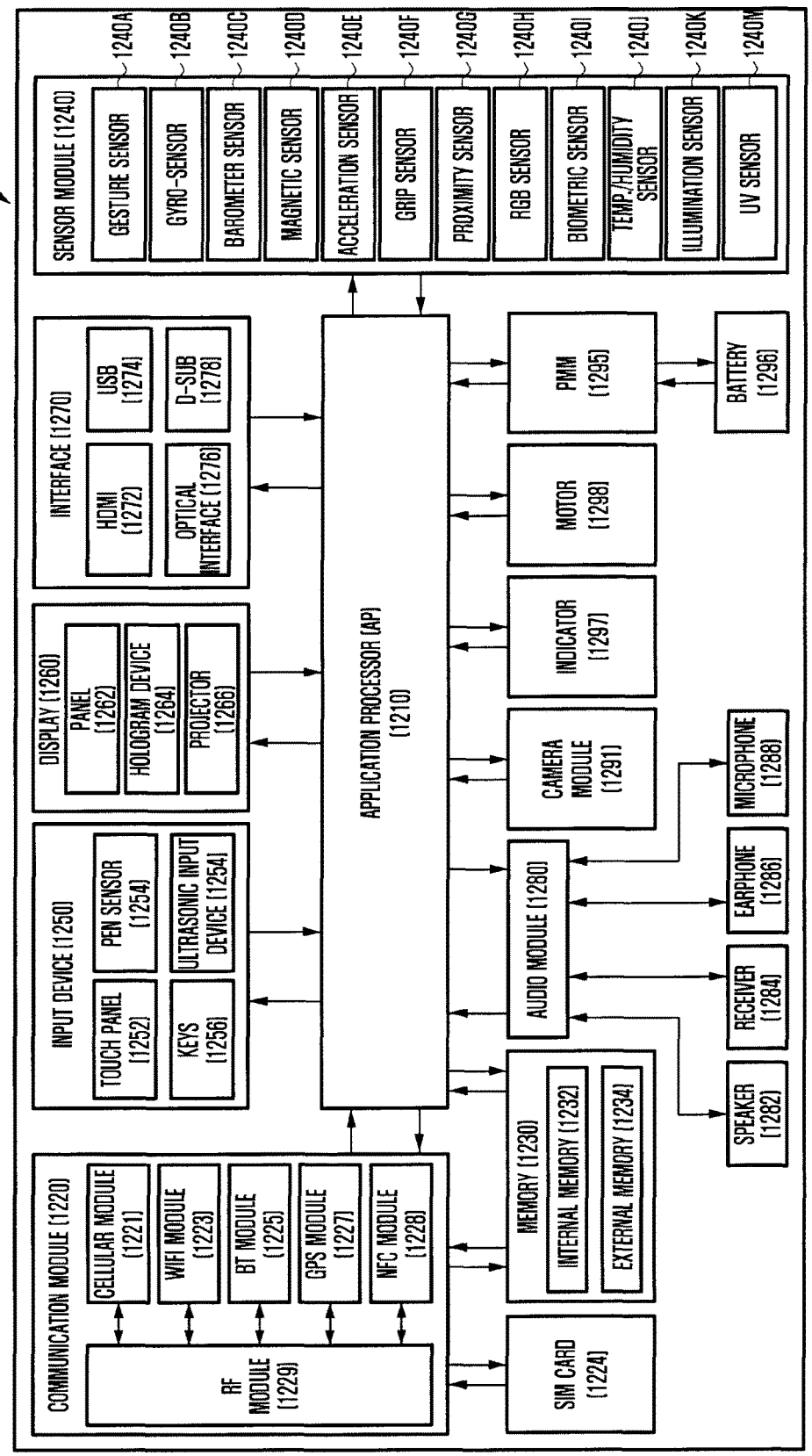
FIG. 12 is a block diagram of an example of an electronic device, according to aspects of the disclosure.

FIG. 12 is a block diagram of an example of an electronic device, according to aspects of the disclosure. The electronic device 1200 may form, for example, the whole or part of the electronic device 101 shown in FIG. 1. Referring to FIG. 12, the electronic device 1200 may include at least one application processor (AP) 1210, a communication module 1220, a subscriber identification module (SIM) card 1224, a memory 1230, a sensor module 1240, an input unit 1250, a display 1260, an interface 1270, an audio module 1280, a camera module 1291, a power management module 1295, a battery 1296, an indicator 1297, and a motor 1298.

The AP 1210 may drive an operating system or applications, control a plurality of hardware or software components connected thereto, and also perform processing and operation for various data including multimedia data. The AP 1210 may be formed of system-on-chip (SoC), for example. According to an embodiment, the AP 1210 may further include a graphic processing unit (GPU) (not shown). Here, the AP 1210 may include the image processing module 170. The AP 1210 may adopt the modules of FIG. 2 to thereby code the color difference data according to the pixel pattern in a color image with the resolution of 4:4:4, and may adopt the module of FIG. 10 to thereby decode the coded color difference data according to the pixel pattern.

The communication module 1220 (e.g., the communication interface 160) may perform a data communication with any other electronic device (e.g., the electronic device 104 or the server 106) connected to the electronic device 1200 (e.g., the electronic device 101) through the network. According to an embodiment, the communication module 1220 may include therein a cellular module 1221, a WiFi module 1223, a BT module 1225, a GPS module 1227, an NFC module 1228, and an RF (Radio Frequency) module 1229.

The cellular module 1221 may offer a voice call, a video call, a message service, an internet service, or the like through a communication network (e.g., LTE, LTE-A, CDMA, WCDMA, UMTS, WiBro, or GSM, etc.). Additionally, the cellular module 1221 may perform identification and authentication of the electronic device in the communication network, using the SIM card 1224. According to an embodiment, the cellular module 1221 may perform at least part of functions the AP 1210 can provide. For example, the cellular module 1221 may perform at least part of a multimedia control function.

According to an embodiment, the cellular module 1221 may include a communication processor (CP). Additionally, the cellular module 1221 may be formed of SoC, for example. Although some elements such as the cellular module 1221 (e.g., the CP), the memory 1230, or the power management module 1295 are shown as separate elements being different from the AP 1210 in FIG. 12, the AP 1210 may be formed to have at least part (e.g., the cellular module 1221) of the above elements in an embodiment.

According to an embodiment, the AP 1210 or the cellular module 1221 (e.g., the CP) may load commands or data, received from a nonvolatile memory connected thereto or from at least one of the other elements, into a volatile memory to process them. Additionally, the AP 1210 or the cellular module 1221 may store data, received from or created at one or more of the other elements, in the nonvolatile memory.

Each of the WiFi module 1223, the BT module 1225, the GPS module 1227 and the NFC module 1228 may include a processor for processing data transmitted or received therethrough. Although FIG. 12 shows the cellular module 1221, the WiFi module 1223, the BT module 1225, the GPS module 1227 and the NFC module 1228 as different blocks, at least part of them may be contained in a single IC (Integrated Circuit) chip or a single IC package in an embodiment. For example, at least part (e.g., the CP corresponding to the cellular module 1221 and a WiFi processor corresponding to the WiFi module 1223) of respective processors corresponding to the cellular module 1221, the WiFi module 1223, the BT module 1225, the GPS module 1227 and the NFC module 1228 may be formed as a single SoC.

The RF module 1229 may transmit and receive data, e.g., RF signals or any other electric signals. Although not shown, the RF module 1229 may include a transceiver, a PAM (Power Amp Module), a frequency filter, an LNA (Low Noise Amplifier), or the like. Also, the RF module 1229 may include any component, e.g., a wire or a conductor, for transmission of electromagnetic waves in a free air space. Although FIG. 12 shows that the cellular module 1221, the WiFi module 1223, the BT module 1225, the GPS module 1227 and the NFC module 1228 share the RF module 1229, at least one of them may perform transmission and reception of RF signals through a separate RF module in an embodiment.

The SIM card 1224 may be a specific card formed of SIM and may be inserted into a slot formed at a certain place of the electronic device. The SIM card 1224 may contain therein an ICCID (Integrated Circuit Card Identifier) or an IMSI (International Mobile Subscriber Identity).

The memory 1230 (e.g., the memory 130) may include an internal memory 1232 and an external memory 1234. The internal memory 1232 may include, for example, at least one of a volatile memory (e.g., DRAM (Dynamic RAM), SRAM (Static RAM), SDRAM (Synchronous DRAM), etc.) or a nonvolatile memory (e.g., OTPROM (One Time Programmable ROM), PROM (Programmable ROM), EPROM (Erasable and Programmable ROM), EEPROM (Electrically Erasable and Programmable ROM), mask ROM, flash ROM, NAND flash memory, NOR flash memory, etc.).

According to an embodiment, the internal memory 1232 may have the form of an SSD (Solid State Drive). The external memory 1234 may include a flash drive, e.g., CF (Compact Flash), SD (Secure Digital), Micro-SD (Micro Secure Digital), Mini-SD (Mini Secure Digital), xD (eXtreme Digital), memory stick, or the like. The external memory 1234 may be functionally connected to the electronic device 1200 through various interfaces. According to an embodiment, the electronic device 1200 may further include a storage device or medium such as a hard drive.

The sensor module 1240 may measure physical quantity or sense an operating status of the electronic device 101, and then convert measured or sensed information into electric signals. The sensor module 1240 may include, for example, at least one of a gesture sensor 1240A, a gyro sensor 1240B, an atmospheric sensor 1240C, a magnetic sensor 1240D, an acceleration sensor 1240E, a grip sensor 1240F, a proximity sensor 1240G, a color sensor 1240H (e.g., RGB (Red, Green, Blue) sensor), a biometric sensor 1240I, a temperature-humidity sensor 1240J, an illumination sensor 1240K, and a UV (ultraviolet) sensor 1240M.

Here, the biometric sensor 1240I may scan fingers of a user. The sensor may be an optical type or a semiconductor type. Furthermore, the sensor 220 may be implemented in a touch sensor type.

Additionally or alternatively, the sensor module 1240 may include, e.g., an E-nose sensor (not shown), an EMG (electromyography) sensor (not shown), an EEG (electroencephalogram) sensor (not shown), an ECG (electrocardiogram) sensor (not shown), an IR (infrared) sensor (not shown), an iris scan sensor (not shown), or a finger scan sensor (not shown). Also, the sensor module 1240 may include a control circuit for controlling one or more sensors equipped therein.

The input unit 1250 may include a touch panel 1252, a digital pen sensor 1254, a key 1256, or an ultrasonic input unit 1258. The touch panel 1252 may recognize a touch input in a manner of capacitive type, resistive type, infrared type, or ultrasonic type. Also, the touch panel 1252 may further include a control circuit. In case of a capacitive type, a physical contact or proximity may be recognized. The touch panel 1252 may further include a tactile layer. In this case, the touch panel 1252 may offer a tactile feedback to a user.

The digital pen sensor 1254 may be formed in the same or similar manner as receiving a touch input or by using a separate recognition sheet. The key 1256 may include, for example, a physical button, an optical key, or a keypad. The ultrasonic input unit 1258 is a specific device capable of identifying data by sensing sound waves with a microphone 1288 in the electronic device 101 through an input tool that generates ultrasonic signals, thus allowing wireless recognition. According to an embodiment, the electronic device 801 may receive a user input from any external device (e.g., a computer or a server) connected thereto through the communication module 1220.

The display 1260 (e.g., the display 150) may include a panel 1262, a hologram 1264, or a projector 1266. The panel 1262 may be, for example, LCD (Liquid Crystal Display), AM-OLED (Active Matrix Organic Light Emitting Diode), or the like. The panel 1262 may have a flexible, transparent or wearable form. The panel 1262 may be formed of a single module with the touch panel 1252. The hologram 1264 may show a stereoscopic image in the air using interference of light. The projector 1266 may project an image onto a screen, which may be located at the inside or outside of the electronic device 101. According to an embodiment, the display 1260 may further include a control circuit for controlling the panel 1262, the hologram 1264, and the projector 1266.

The interface 1270 may include, for example, an HDMI (High-Definition Multimedia Interface) 1272, a USB (Universal Serial Bus) 1274, an optical interface 1276, or a D-sub (D-subminiature) 1278. The interface 1270 may be contained, for example, in the communication interface 160 shown in FIG. 1. Additionally or alternatively, the interface 1270 may include, for example, an MHL (Mobile High-definition Link) interface, an SD (Secure Digital) card/MMC (Multi-Media Card) interface, or an IrDA (Infrared Data Association) interface.

The audio module 1280 may perform a conversion between sounds and electric signals. At least part of the audio module 1280 may be contained, for example, in the input/output interface 140 shown in FIG. 1. The audio module 1280 may process sound information inputted or outputted through a speaker 1282, a receiver 1284, an earphone 1286, or a microphone 1288.

The camera module 1291 is a device capable of obtaining still images and moving images. According to an embodiment, the camera module 1291 may include at least one image sensor (e.g., a front sensor or a rear sensor), a lens (not shown), an ISP (Image Signal Processor, not shown), or a flash (e.g., LED or xenon lamp, not shown).

The power management module 1295 may manage electric power of the electronic device 101. Although not shown, the power management module 1295 may include, for example, a PMIC (Power Management Integrated Circuit), a charger IC, or a battery or fuel gauge.

The PMIC may be formed, for example, of an IC chip or SoC. Charging may be performed in a wired or wireless manner. The charger IC may charge a battery 1296 and prevent overvoltage or overcurrent from a charger. According to an embodiment, the charger IC may have a charger IC used for at least one of wired and wireless charging types. A wireless charging type may include, for example, a magnetic resonance type, a magnetic induction type, or an electromagnetic type. Any additional circuit for a wireless charging may be further used such as a coil loop, a resonance circuit, or a rectifier.

The battery gauge may measure the residual amount of the battery 1296 and a voltage, current or temperature in a charging process. The battery 1296 may store or create electric power therein and supply electric power to the electronic device 101. The battery 1296 may be, for example, a rechargeable battery or a solar battery.

The indicator 1297 may show thereon a current status (e.g., a booting status, a message status, or a recharging status) of the electronic device 101 or of its part (e.g., the AP 1210). The motor 1298 may convert an electric signal into a mechanical vibration. Although not shown, the electronic device 101 may include a specific processor (e.g., GPU) for supporting a mobile TV. This processor may process media data that comply with standards of DMB (Digital Multimedia Broadcasting), DVB (Digital Video Broadcasting), or media flow.

The above-described components of the electronic device according to various embodiments of the present disclosure may be formed of one or more components, and a name of a corresponding component element may be changed based on the type of electronic device. The electronic device according to various embodiments of the present disclosure may be formed to include at least one of the above-described components, and some of the components may be omitted or additional components may be further included. Further, some of the components of the electronic device according to the various embodiments of the present disclosure may be combined to form a single entity, and thus, may equivalently execute functions of the corresponding elements prior to the combination.

Figure 9:
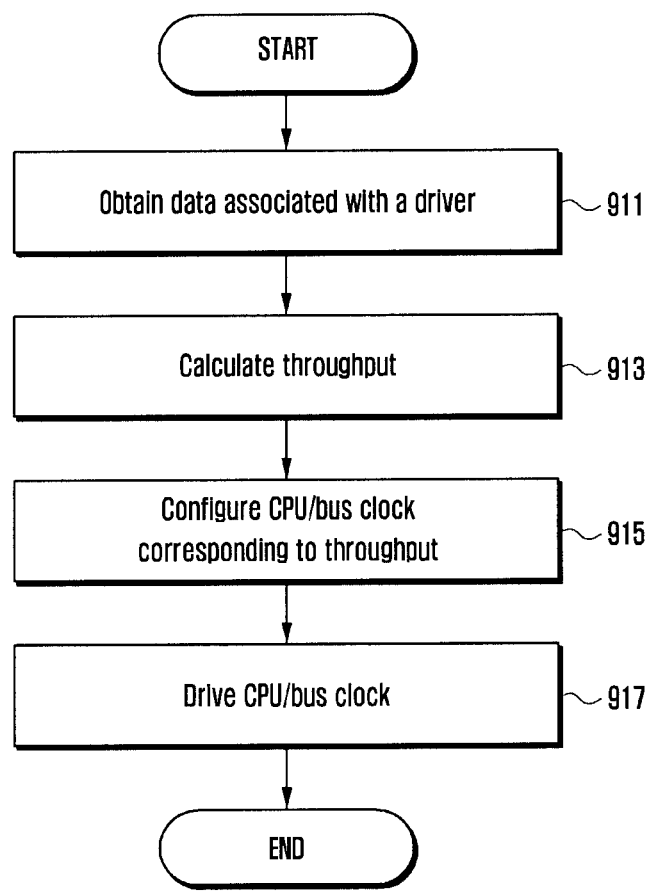
FIG. 9 is a flowchart of an example of a process, according to aspects of the disclosure.

FIG. 9 is a flowchart of an example of a process, according to aspects of the disclosure. FIG. 9 may be an example showing a single operation scenario in the symmetric multi-processing (SMP) environment.

In operation 911, the electronic device may obtain data associated with a driver. In operation 913, the electronic device may calculate the throughput of the driver based on the data. In operation 915, the electronic device may compare the calculated throughput value with the predetermined throughput values in the table of the corresponding data type to thereby configure the clock data. In operation 917, the electronic device may drive the configured clock data as the CPU clock and the bus clock in operation 917.

In this example, the driver is a WIFI driver, and the setup values of the throughput are the same as shown in Table 6 below. For example, the setup values may include CPU clock setup values, MIF clock setup values, or INT clock setup values.

TABLE 6

| level | Throughput threshold | CPU frequency | MIF frequency | INT frequency |
|---|---|---|---|---|
| 1 | 100 Mbps | 1.0 GHz | 533 Mhz | 833 Mhz |
| 2 | 150 Mbps | 1.3 GHz | 833 Mhz | 833 Mhz |

The driver, such as the WIFI driver, may continuously update the size of the received data and the size of the transmitted data. In addition, the throughput monitoring unit may periodically calculate the current throughput and may notify the throughput controller of the calculated throughput value.

In some implementations, when the throughput of the driver reaches a predetermined threshold, the throughput monitoring unit may raise a "throughput change event." For example, if the WIFI throughput reaches 100 Mbps to 150 Mbps in Table 6, the throughput monitoring unit may inform the throughput controller of the throughput value and the identification information of the driver corresponding to the throughput. The throughput monitoring unit may be notified in the case where the value has been recorded in the file node, and the throughput controller (e.g., a notifying handler) may identify the file node value to determine that it corresponds to the WIFI level 1 of the throughput setup values. Then, throughput controller may configure the CPU/MIF/INT frequency corresponding to the level 1 through the clock driving unit.

The electronic device may input the size of data processed in one or more drivers, and may calculate the size of data, which has been processed in the driver, into the throughput. Afterwards, the electronic device may analyze the calculated throughput to control the throughput, which determines the clock of the corresponding driver device, and may drive the clock of the devices related to the driver using the determined clock.

Figure 10:
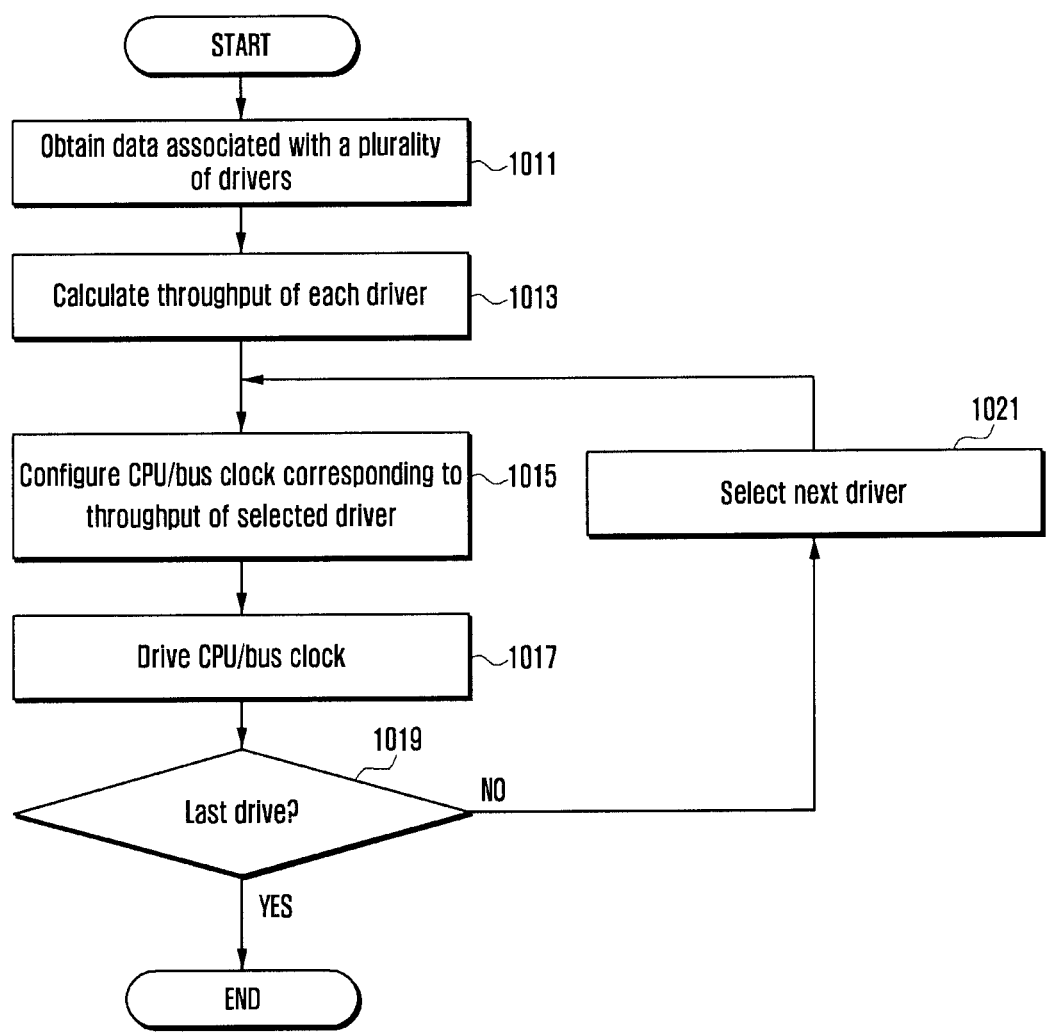
FIG. 10 is a flowchart of an example of a process, according to aspects of the disclosure.

FIG. 10 is a flowchart of an example of a process, according to aspects of the disclosure. FIG. 10 may be an example showing a multi-operation scenario in the symmetric multi-processing (SMP) environment.

Referring to FIG. 10, the drivers may continually update the size of the received packet data and the transmitted packet data in the locations of the file nodes X, Y, and the like. In operation 1011, the electronic device may obtain data associated with a plurality of drivers. In operation 1013, the electronic device may calculate throughput of each of the drivers based on the data. In operation 1015, the electronic device may compare the calculated throughput of one of the drivers with the predetermined throughput values in the table corresponding that driver to thereby configure the clock data. In operation 1017, the electronic device may drive the configured clock data as the CPU clock and the bus clock.

In operation 1021, the electronic device may check whether or not the driver of the currently configured clock frequency is the last one, and if the driver is not the last one, the electronic device may select the next driver and repeat operations 1015-1017 for another one of the drivers. The electronic device may renew and configure the clock frequency according to the throughput of all of the drivers through the repeated operations above.

In this example, the drivers whose throughput is determined include a WIFI driver and a MODEM driver, and the setup values of the throughput are the same as Table 7 and Table 8 below.

TABLE 7

| Level (WIFI) | Throughput threshold | CPU frequency | MIF frequency | INT frequency |
|---|---|---|---|---|
| 1 | 100 Mbps | 1.0 GHz | 533 Mhz | 833 Mhz |
| 2 | 150 Mbps | 1.3 GHz | 833 Mhz | 833 Mhz |

TABLE 8

| Level (MODEM) | Throughput threshold | CPU frequency | MIF frequency | INT frequency |
|---|---|---|---|---|
| 1 | 130 Mbps | 1.4 GHz | 333 Mhz | 533 Mhz |
| 2 | 250 Mbps | 1.8 GHz | 833 Mhz | 833 Mhz |

The drivers, such as the WIFI driver and the MODEM driver, may continue to update the size of the received data (the packet/transmitted packet data) in the file nodes (e.g., the file nodes X and Y). Then, the throughput monitoring unit may read the locations of the file nodes at a specific time interval to thereby calculate the current throughput value (the size/time of data), and may record the calculated throughput value and the driver identification information in the file nodes (or the memory).

For example, if the WIFI throughput value reaches 100 Mbps to 150 Mbps, and if the MODEM throughput value reaches 200 Mbps, the throughput monitoring unit may write the throughput value and the driver information corresponding to the throughput in the file node twice. Then, when the throughput value is recorded in the file node, the throughput controller may be notified of the same. Therefore, the throughput controller may identify the throughput value of the file node, and may determine the minimum value among the throughput setup values as shown in Table 7 to thereby configure the clock frequency. The throughput controller may configure the CPU frequency (1.4 GHz) corresponding to the MODEM level 1, the MIF frequency (533 MHz) corresponding to the WIFI level 1, and the frequency (833 MHz) corresponding to the INT through the clock driving unit. In other words, when multiple drivers are monitored, the current throughput of each driver may be associated with a different configuration setting (e.g., CPU clock frequency value). In such instances, the throughput controller may identify the configuration setting associated with each throughput value to obtain a set of configuration settings (e.g., a set of CPU frequency values), wherein each member of the set corresponds to the throughput of a different driver. And finally, the throughput controller may select one of the configuration settings from the set based on a predetermined criterion and re-configure the electronic device in accordance with the selected configuration setting. As noted above, the throughput controller may select the configuration setting having the lowest value.

Figure 11:
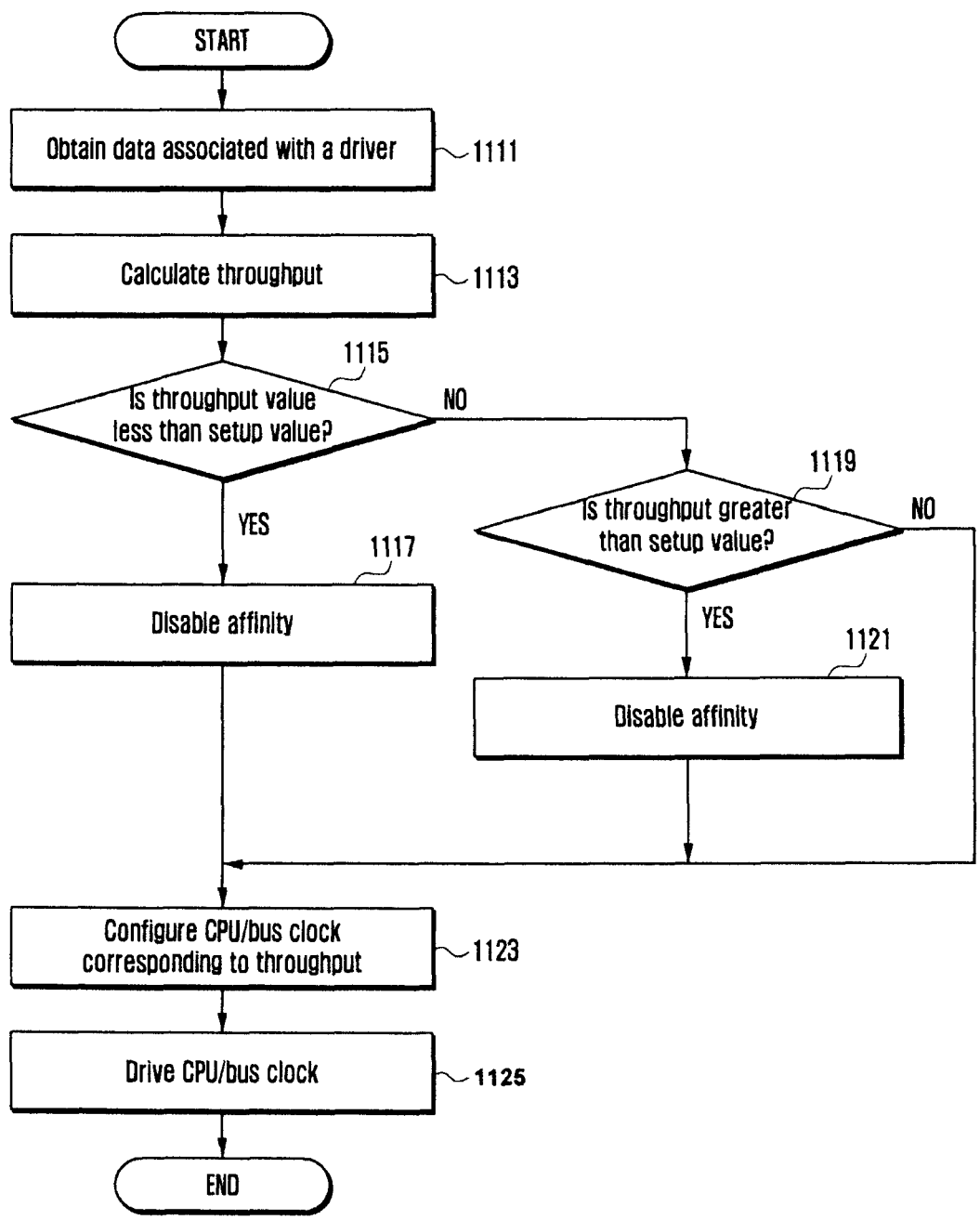
FIG. 11 is a flowchart of an example of a process, according to aspects of the disclosure.

FIG. 11 is a flowchart of an example of a process, according to aspects of the disclosure. FIG. 11 may be an example showing an operation scenario in the heterogeneous multi-processing (HMP) environment.

Referring to FIG. 11, the drivers may continue to update the size of data (the received packet data and the transmitted packet data) in the file nodes (or the memory). In operation 1111, the electronic device may obtain data associated with a driver. In operation 1113, the electronic device may calculate the throughput of the driver based on the data.

In operation 1115, the electronic device may compare the throughput value with the setup value. If the throughput value is less than the setup value, the electronic device may allow the affinity function to be disabled in operation 1117. If the throughput value is greater than the setup value, the electronic device may allow the affinity function to be enabled in operation 1121. In addition, if the throughput value is within a predetermined range, the affinity function may remain.

In operation 1123, after allocating the task to a specific processor core through the affinity function, the electronic device may compare the calculated throughput value with the predetermined throughput values in the table of the corresponding data type to thereby configure the clock data. In operation 1125, the electronic device may drive the configured clock data as the CPU clock and the BUS clock.

In this example, the driver whose throughput is determined is a WIFI driver, and the setup values of the throughput are the same as Table 9 below.

TABLE 9

| level | Throughput threshold | CPU frequency | MIF frequency | INT frequency | Task affinity | IRQ affinity |
|---|---|---|---|---|---|---|
| 1 | 100 Mbps | 1.0 GHz | 533 Mhz | 833 Mhz | OFF | OFF |
| 2 | 150 Mbps | 1.3 GHz | 833 Mhz | 833 Mhz | ON | ON |

In the case of the WIFI, it is assumed that there are task t1, and task t2 for processing the WIFI interruption. In addition, it is assumed that a high-performance CPU X1 is configured for the task t1 when the throughput value exceeds 150 Mbps, and the interruption is to be processed by a high-performance CPU X2 in the WIFI driver. In this case, task t1 information, in which the task affinity is configured as X1, and task t2 information, in which the IRQ affinity is configured as X2, may be created.

The WIFI driver may continuously update the size of data (the received packet data and the transmitted packet data). In addition, the throughput calculating unit may read the data at a specific time interval to thereby calculate the current throughput (the size/time of data). At this time, if the WIFI throughput value reaches 200 Mbps, the throughput calculating unit may record the throughput value and the driver identification information corresponding thereto in the throughput controller (the file node or the memory).

In addition, when the throughput value and the driver identification information are recorded, the throughput calculating unit may be notified of the same. Then, the throughput calculating unit may identify the throughput value and the identification information, and may determine the minimum value among the throughput setup values as shown in Table 9. For example, if it is identified that the throughput value is 200 Mbps, the throughput calculating unit may configure the CPU/MIF/INT frequency to the values listed in the level 2 row of Table 9. At this time, since the throughput value is greater than the setup value for the affinity enablement, the throughput controller may make a request to the HMP scheduler for task affinity enablement/IRQ affinity enablement.

Then, if the task affinity is enabled at the time when the task t1 is scheduled, the HMP scheduler may allocate the task t1 to the CPU X1, and if the IRQ affinity is enabled at the time when the task t2 is scheduled, the HMP scheduler may allocate the task t2 to the CPU X2.

In addition, when the throughput value decreases {e.g., when the throughput value decreases from 200 Mbps (level 2) to 100 Mbps (level 1)}, the throughput controller may reduce the frequency to conform to the corresponding level, or may allow the affinity to be disabled in the operation above.

The "module" used in various embodiments of the present disclosure may refer to, for example, a "unit" including one of hardware, software, and firmware, or a combination of two or more of the hardware, software, and firmware. The "module" may be interchangeable with a term, such as a unit, a logic, a logical block, a component, or a circuit. The "module" may be a minimum unit of an integrated component element or a part thereof. The "module" may be a minimum unit for performing one or more functions or a part thereof. The "module" may be mechanically or electronically implemented. For example, the "module" according to various embodiments of the present disclosure may include at least one of an Application-Specific Integrated Circuit (ASIC) chip, a Field-Programmable Gate Arrays (FPGAs), and a programmable-logic device for performing operations which have been known or are to be developed hereafter.

According to various embodiments, at least part of a device (for example, modules or functions thereof) or a method (for example, operations) according to the various embodiments of the present disclosure may be embodied by, for example, an instruction stored in a computer readable storage medium provided in a form of a programming module. When the command is executed by one or more processors (for example, the processor 210), the one or more processors may execute a function corresponding to the command. The computer-readable storage medium may, for example, be the memory 220. At least a part of the programming module may be implemented (for example, executed) by, for example, the processor 210. At least a part of the programming module may, for example, include a module, a program, a routine, a set of instructions, or a process for performing at least one function.

The computer-readable recording medium may include magnetic media such as a hard disk, a floppy disk, and a magnetic tape, optical media such as a Compact Disc Read Only Memory (CD-ROM) and a Digital Versatile Disc (DVD), magneto-optical media such as a floptical disk, and hardware devices specially configured to store and perform a program instruction (for example, programming module), such as a Read Only Memory (ROM), a Random Access Memory (RAM), a flash memory and the like. In addition, the program instructions may include high-class language codes, which can be executed in a computer by using an interpreter, as well as machine codes made by a compiler. The aforementioned hardware device may be configured to operate as one or more software modules in order to perform the operation of various embodiments of the present disclosure, and vice versa.

A module or a programming module according to the present disclosure may include at least one of the described component elements, a few of the component elements may be omitted, or additional component elements may be included. Operations executed by a module, a programming module, or other component elements according to various embodiments of the present disclosure may be executed sequentially, in parallel, repeatedly, or in a heuristic manner. Further, some operations may be executed according to another order or may be omitted, or other operations may be added.

FIGS. 1-12 are provided as an example only. At least some of the steps discussed with respect to these figures can be performed concurrently, performed in a different order, and/or altogether omitted. It will be understood that the provision of the examples described herein, as well as clauses phrased as "such as," "e.g.", "including", "in some aspects," "in some implementations," and the like should not be interpreted as limiting the claimed subject matter to the specific examples.

The above-described aspects of the present disclosure can be implemented in hardware, firmware or via the execution of software or computer code that can be stored in a recording medium such as a CD-ROM, a Digital Versatile Disc (DVD), a magnetic tape, a RAM, a floppy disk, a hard disk, or a magneto-optical disk or computer code downloaded over a network originally stored on a remote recording medium or a non-transitory machine-readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for".

While the present disclosure has been particularly shown and described with reference to the examples provided therein, it will be understood by those skilled in the art that various changes in form and details may be made therein without departing from the spirit and scope of the present disclosure as defined by the appended claims.

What is claimed is:

1. An apparatus comprising,
a memory; and
at least one processor configured to:
execute a plurality of device drivers for operating at least one device included in the apparatus;
identify a data throughput of each of the plurality of device drivers;
determine a setup value of each of the plurality of device drivers based on the data throughput of each of the plurality of device drivers, wherein the setup value is determined by using a table which corresponds to each of the plurality of device drivers, and wherein the table comprises a plurality of setup values which are mapped to each of a plurality of data throughputs;
change a clock frequency of one or more hardware components of the apparatus and a clock frequency of a bus based on the data throughput of each of the plurality of device drivers; and
operate the at least one device by setting the each of the plurality of device drivers to the determined setup value.

2. The apparatus of claim 1, wherein the at least one processor is further configured to:
generate a message including an indication of the data throughput of each of the plurality of device drivers and device driver identifiers corresponding to each of the plurality of device drivers; and
access a data structure mapped to the data throughput and the device driver identifiers in order to determine the setup value.

3. The apparatus of claim 1, wherein the setup value includes at least one of a clock frequency associated with the at least one device and an interrupt affinity setting associated with each of the plurality of device drivers.

4. The apparatus of claim 1, wherein the data throughput is calculated based on at least one of an amount of data received by each of the plurality of device drivers within a predetermined time period and an amount of data output by each of the plurality of device drivers within the predetermined time period.

5. The apparatus of claim 1, wherein the bus includes an internal bus of the at least one processor.

6. The apparatus of claim 1, wherein the bus connects the at least one processor to one or more hardware components of the apparatus that are external to the processor.

7. The apparatus of claim 1, wherein the at least one processor is further configured to change an affinity setting associated with the at least one processor.

8. The apparatus of claim 7, wherein the affinity setting includes at least one of a task affinity setting and an interrupt affinity setting.

9. The apparatus of claim 1, wherein the at least one processor is further configured to:
execute a scheduler, and
change a state of the scheduler.

10. The apparatus of claim 9, wherein the at least one processor is further configured to execute the scheduler to schedule a process or a thread associated with the plurality of device drivers to a processor core specified by the setup value.

11. A method of an electronic device, the method comprising:
executing, by at least one processor of the electronic device, a plurality of device drivers for operating at least one device included in the electronic device;
identifying, by the at least one processor, a data throughput of each of the plurality of device drivers;
determining, by the at least one processor, a setup value of each of the plurality of device drivers based on the data throughput of each of the plurality of device drivers, wherein the setup value is determined by using a table which corresponds to each of the plurality of device drivers, and wherein the table comprises a plurality of setup values which are mapped to each of a plurality of data throughputs;
changing a clock frequency of one or more hardware components of the electronic device and a clock frequency of a bus in the electronic device based on data throughput of each of the plurality of device drivers; and
operating, by the at least one processor, the at least one device by setting the each of the plurality of device drivers to the determined setup value.

12. The method of claim 11, further comprising:
generating a message including an indication of the data throughput of each of the plurality of device drivers and device driver identifiers corresponding to each of the plurality of device drivers; and
accessing a data structure mapped to the data throughput and the device driver identifiers in order to determine the setup value.

13. The method of claim 11, wherein the setup value includes at least one of a clock frequency associated with the at least one device and an interrupt affinity setting associated with each of the plurality of device drivers.

14. The method of claim 11, wherein the data throughput is calculated based on at least one of an amount of data received by each of the plurality of device drivers within a predetermined time period and an amount of data output by each of the plurality of device drivers within the predetermined time period.

15. The method of claim 11, wherein the bus includes an internal bus of the at least one processor of the electronic device.

16. The method of claim 11, wherein the bus connects the at least one processor of the electronic device to one or more hardware components of the electronic device that are external to the at least one processor.

17. The method of claim 11, wherein operating the at least one device comprises changing an affinity setting associated with the at least one processor of the electronic device.

18. The method of claim 17, wherein the affinity setting includes at least one of a task affinity setting and an interrupt affinity setting.

19. The method of claim 11, wherein operating the at least one device comprises:
   executing a scheduler; and
   changing a state of the scheduler.

20. The method of claim 19, wherein changing the state of the scheduler includes executing the scheduler to schedule a process or a thread associated with the device driver to a processor core specified by the setup value.

\* \* \* \* \*